United States Patent [19]

Baker

[11] Patent Number: 4,982,101
[45] Date of Patent: Jan. 1, 1991

[54] FIBERGLASS COLLAR FOR DATA TRANSFER FROM ROTATABLE SHAFT

[75] Inventor: Matt Baker, Carson City, Nev.

[73] Assignee: Bently Nevada Corporation, Minden, Nev.

[21] Appl. No.: 447,558

[22] Filed: Dec. 7, 1989

Related U.S. Application Data

[62] Division of Ser. No. 252,838, Sep. 30, 1988.

[51] Int. Cl.$^5$ .................................... G02B 27/00
[52] U.S. Cl. .......................... 250/551; 340/870.28
[58] Field of Search ................ 250/551; 350/96.2; 340/870.28; 307/311; 455/602

[56] References Cited

U.S. PATENT DOCUMENTS

| | | | |
|---|---|---|---|
| 4,175,230 | 11/1979 | Richards et al. | 340/870.28 |
| 4,190,318 | 2/1980 | Upton, Jr. | 350/96.2 |
| 4,278,323 | 7/1981 | Waldman | 250/551 |
| 4,456,903 | 6/1984 | Kishi | 350/96.2 |
| 4,466,695 | 8/1984 | Kruger | 250/551 |

Primary Examiner—David C. Nelms
Assistant Examiner—Stephone B. Allen
Attorney, Agent, or Firm—Flehr, Hohbach, Test, Albritton & Herbert

[57] ABSTRACT

Telemetry apparatus for a rotating machine shaft includes a fixed collar of lightweight composite material wrapped on the shaft and having embedded in it telemetry apparatus. Measured data such as torque from a strain gauge sensor is transmitted to a stationary sensor by pulses of infrared signals. An array of photovoltaic cells receives energy from a stationary source to power the rotating telemetry apparatus. All rotating electronics is embedded in the composite material which may be, for example, E-type fiberglass. Such composite material provides a resistance to centrifugal forces due to rotation of the shaft but has sufficient transparency to allow both the transmission of data and power to and from the rotating telemetry.

5 Claims, 4 Drawing Sheets

FIBERGLASS COLLAR FOR DATA TRANSFER FROM ROTATABLE SHAFT

This is a division of application Ser. No. 252,838 filed Sept. 30, 1988, entitled "Fiberglass Collar for Data Transfer from Rotatable Shaft."

The present invention is directed to both apparatus and a method for forming a fixed collar of lightweight composite material on a rotatable shaft with the collar having embedded in it telemetry apparatus for providing transmission of measured signals without a mechanical interface.

BACKGROUND OF THE INVENTION

A number of techniques are available to transmit signals from a rotatable machine shaft to a stationary receiver located adjacent to the shaft. These techniques include radio frequency telemetry, induction power and signal telemetry, the use of slip rings, and optical telemetry using photovoltaic power and infrared signal telemetry. Each of these techniques requires that a mechanical attachment in the form of a collar must be made between the telemetry components and the rotating shaft.

Various methods have been used to attach the telemetry system to a high speed shaft which include the use of machined one half cylindrical structures which are then bolted to a high speed shaft. This technique is largely unsuccessful due to the relatively high mass of the structure which creates significant bolt stress at speed. Potential bolt failure and catastrophic clamp failure can result from machine overspeed or unknown fatigue characteristics. An infinite variety of machine shaft diameters requires that each structure must be custom machined to fit a particular shaft. This is a costly process.

Other attempts to attach systems to the shaft use an intermediate assembly which replaces the machine coupling with the telemetry coupling device. Typically these devices are not suitable for transferring the high torque loads associated with industrial machinery.

Additional problems are unique to optical telemetry systems. These systems require the use of windows to allow power and data transmission. Typically these windows are made by using glass or clear plastic which often fail in service due to poor strength. In other designs the shaft is modified to provide cavities for the microelectronic components and optical devices which are then epoxied into place. This results in stress concentrations and possible shaft failure.

In every case the telemetry system is difficult to install, expensive to fabricate, mechanically unreliable and often results in reduced strength and reliability of the rotor system.

OBJECTS OF THE INVENTION

A general object of the present invention is to provide an improved mounting for telemetry apparatus on a rotating machine shaft.

Another object of the invention is to provide a safe, highly reliable, low cost design for the foregoing which does not sacrifice rotor structural integrity.

Yet another object of the invention is to provide apparatus and a method as above which can be used on a wide variety of shaft diameters with no expensive machining operations.

In accordance with the above objects, there is provided telemetry apparatus for transmitting data from the high speed rotating machine shaft to a stationary receiver without a mechanical interface comprising a collar of light weight composite material wrapped around and fixed to the shaft which resists centrifugal forces due to the high speed shaft rotation. The collar has imbedded in it a first portion of the telemetry apparatus for transmitting data by light or electromagnetic means to the stationary receiver through a portion of the composite material which is substantially transparent to the transmission. The collar also has imbedded in it a second portion of the telemetry apparatus for receiving energy from the stationary receiver for powering the first portion of the telemetry in the form of light or electromagnetic energy through a portion of the composite material substantially transparent to the energy.

From a general standpoint the invention is also applicable to non-optical electromagnetic techniques.

DETAILED DESCRIPTION OF PREFERRED EMBODIMENT

Figure 1:
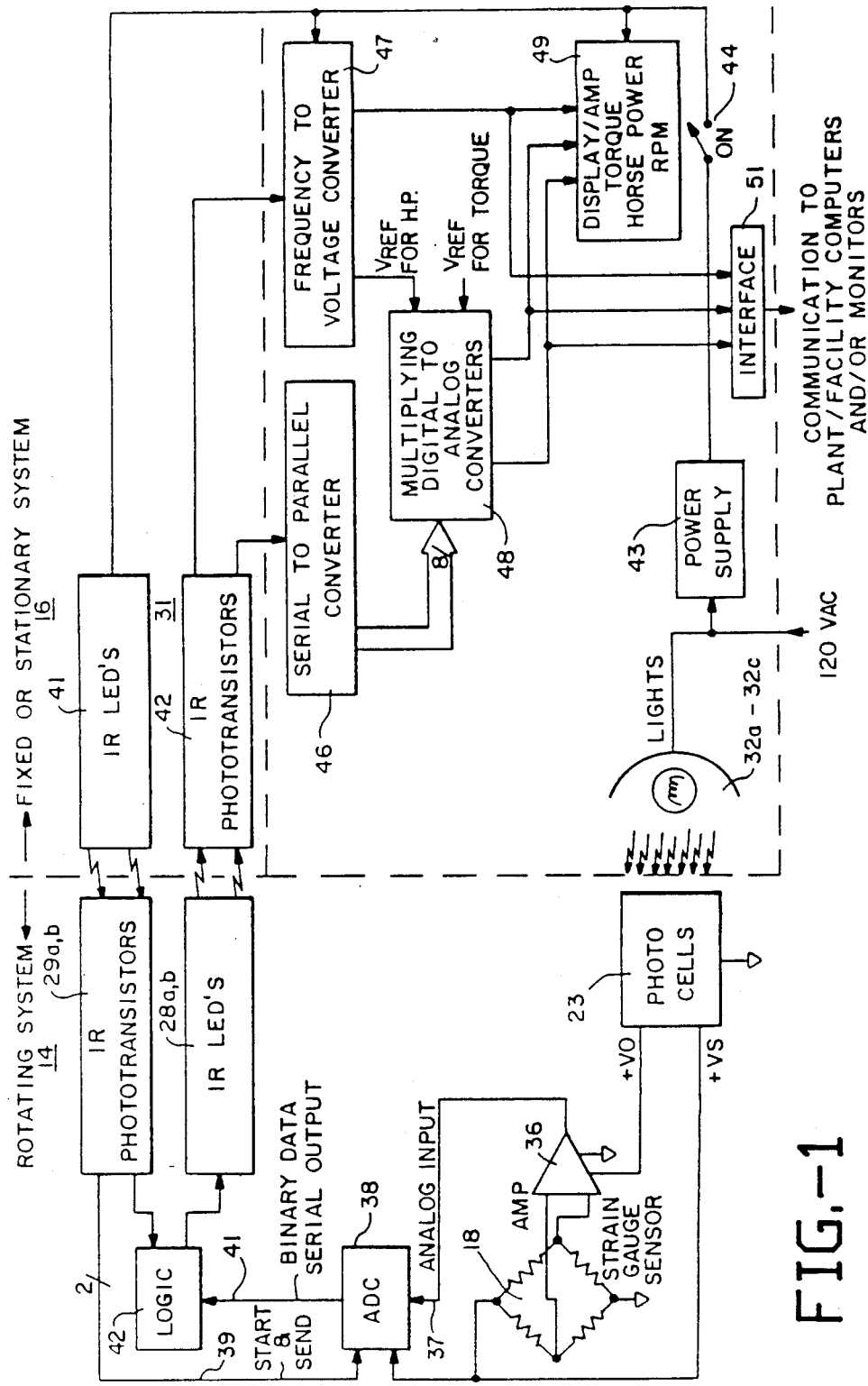
FIG. 1 is a block diagram showing a telemetry system which can utilize the present invention.

FIG. 1 illustrates in block diagram form a typical telemetry system where a portion of 14 termed "the rotating system" is mounted on a rotating shaft and the stationary or fixed system 16 receives the data signals from the rotating system carrying information such as torque, etc.

In rotating system 14 a strain gauge 18 produces an analog signal amplified by an instrumentation amplifier 36 to provide an analog input 37 to an analog to digital converter 38. This converter is responsive to start and send signals on its input line 39 to provide a binary data serial output on line 41 which, via logic unit 40, drives infrared light emitting diodes 28a and 28b. Start and send signals on line 39 are provided by the phototransistors 29a and 29b.

To power all the foregoing instrumentation the photocells 23 are illuminated by the light 32 during at least a pertinent portion of its rotation while data is being transferred.

In stationary system 16 the telemetry is completed with the transmitting light emitting diodes 41 and the receiving infrared phototransistors 42. Diodes 41 are powered continuously via the power supply 43 and the switch 44. Data is received by the phototransistors 42 and coupled to a serial to parallel converter 46 and frequency to voltage converter 47. A series of data manipulations is accomplished by the multiplying digital to analog converters 48. A display of torque, horsepower and revolutions per minute at 49 is provided. All of these outputs are also coupled to an interface unit 51 for transmission to other monitors or plant/facility computer.

Figure 2:
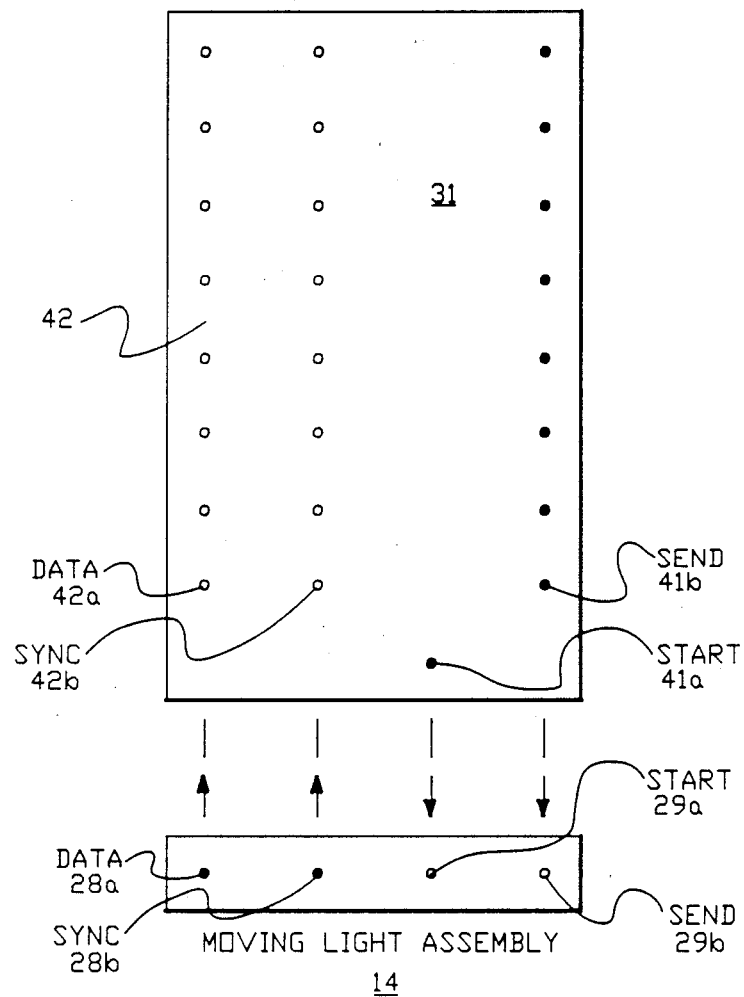
FIG. 2 is a simplified plan view of the optical portion of the telemetry of FIG. 1.

FIG. 2 fully illustrates the communication between the stationary system 16 and the rotating system 14. At least the optical transmission portions are illustrated. The infrared light emitting diodes are shown as solid dots and the phototransistors as small circles. The arrows between the stationary assembly and moving assembly show the respective transmission of data or "handshaking" which must occur between the two assemblies for an effective transmission of measured signals from the rotating shaft to the stationary receiver.

Further details of the operation of the telemetry system as thus far described are fully disclosed and claimed in co-pending application, Ser. No. 187,197 filed Apr. 28, 1988, entitled "Wireless Data Coupling System and Method."

Figure 3:
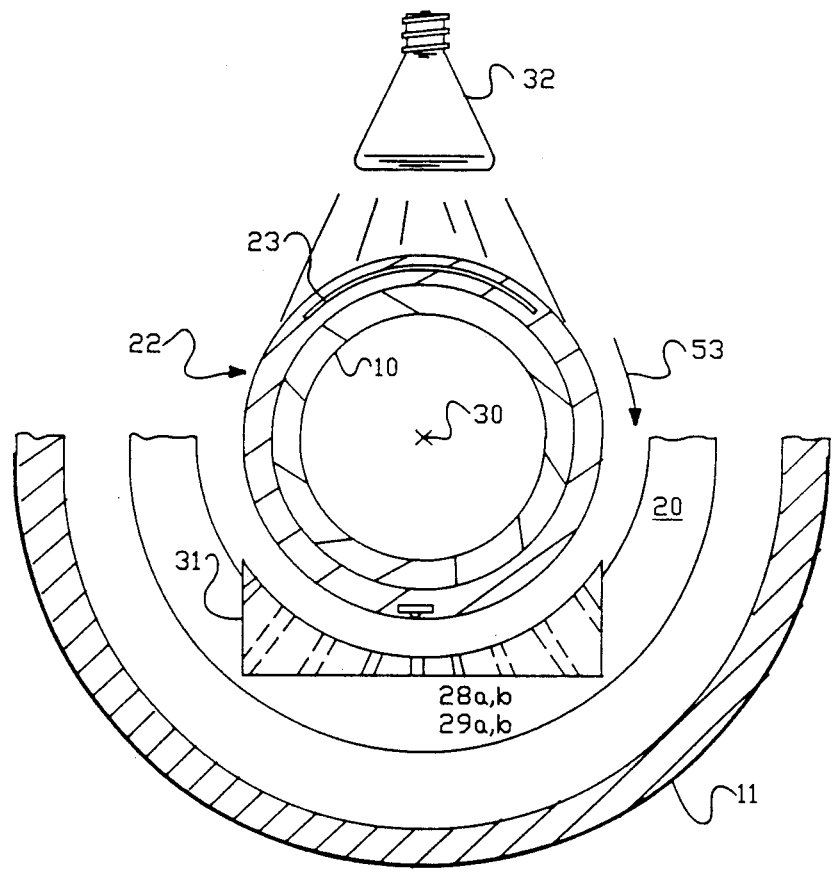
FIG. 3 is a partial cross sectional view of a shaft, along with associated components of the stationary receiver, showing how the collar of the present invention is mounted on the shaft.

The cross sectional view of FIG. 3 illustrates the actual collar 22 of the present invention as it would be installed on a hollow shaft 10 having an axis of rotation indicated at 30 in the direction indicated by the arrow 53. A base 20 supports the stationary light assembly 31 with phototransistors and infrared light emitting diodes (LED) 41, 42. A protective cylindrical cover 11 is provided. Base 20 is in an arcuate curved shape to match the curvature of the shaft and the rotating collar 22. Embedded in this collar of composite material is a first telemetry portion 28a, 28b, and 29a, 29b, which transmits data to the stationary assembly 31. The remaining portions of the associated circuit board have been eliminated for simplicity.

Then a second portion of the embedded telemetry apparatus are the photocells 23, which receive the light energy from source 32. As will be discussed below, the composite material retains these two telemetry portions, protecting them, and allowing them to resist the centrifugal forces associated with shaft rotation. At the same time, the material overlaying these telemetry portions is sufficiently transparent to allow either data transfer or transfer of energy for powering purposes, whichever is the case.

Figure 4:
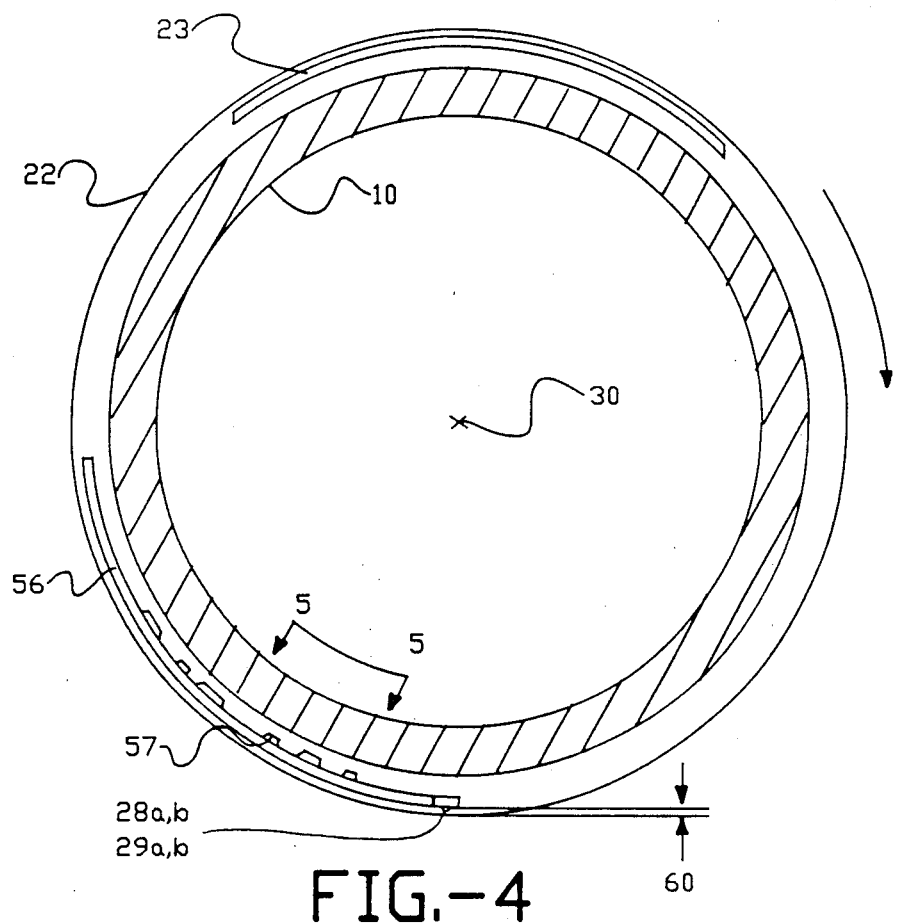
FIG. 4 is a cross sectional view in more detailed form of a portion of FIG. 3.

Now referring to FIG. 4, the infrared light transmitting and receiving portions 28, 29 of the rotating system are usually part of the overall rotating system circuit 14 (as illustrated fully in FIG. 1), which includes the printed circuit board 56 on which various integrated circuit components 57 are arranged, along with connecting circuitry. Of course, the board 56 would be electrically connected, as illustrated in FIG. 1, to the strain gauge 18 (not shown in FIG. 4) which is affixed directly to the shaft 10, and to the photocell array 23. The connecting wires are easily embedded in collar 22 at the same time as the circuit board 56 and the photocells 23.

The process for forming the collar of FIG. 4 is typically as follows. First, there is wound circumferentially around the shaft composite material, such as unidirectional E fiberglass filament preimpregnated tape. Such tape is available from, for example, 3M Corporation and may have a dimension of 3" width and 9 mils thickness. Several layers are wrapped around the shaft to create a thickness at least equal to that of the maximum thickness of one of the circuit components 57 of the PC board 56. This provides a sufficient standoff for the electronic components.

Figure 5:
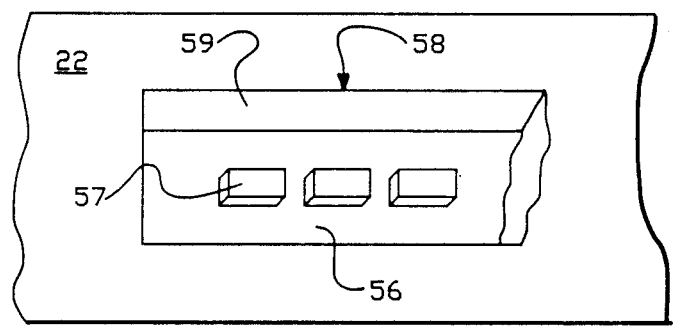
FIG. 5 is a plan view partially cut away and simplified, taken along the line 5-5 of FIG. 4.

Next, a cavity is cut into the above to accommodate the telemetry apparatus which includes the printed board 56 and the photocells 23. FIG. 5 illustrates the foregoing where a cavity 58 accommodates the board 56 with the components 57. Then, by the use of epoxy or other suitable adhesive at 59, the telemetry apparatus is cemented into the collar 22. The view of FIG. 5, of course, shows the process looking from the inside of the shaft 10 with the shaft of course broken away.

After embedding or affixing the telemetry apparatus to the first wrapping of the collar, more layers are wrapped or wound over the components to the required thickness; such thickness is determined by both the strength of the composite material and reinforcing fibers to resist centrifugal force and retain the collar itself on the rotating shaft and, in addition, to provide sufficient transparency. In the particular case of the preferred embodiment, transparency to infrared signals to allow transmission of this IR data from the rotating telemetry apparatus. Also, of course, the light energy supplied to the photocells 23 must reach the cells with sufficient intensity to provide adequate power for the printed circuit 56.

Other suitable composite materials include carbon, graphite, Aramid kevlar, S fiberglass or any combination of the above. Since the primary forces acting on the collar 22 during rotation are greatest in the tangential and radial directions, the maximum strength is achieved by winding unidirectional fiber tapes or single filaments around the circumference of the shaft. The tapes can be preimpregnated as used in the preferred embodiment or dry or wet lay-up type.

Also, rather than utilizing single composite material, the initial winding layer on the shaft 10 can be of foam or honeycomb core material. The important aspect of the composite material is that the material overlaying the telemetry apparatus has transparent windows to allow both data transfer and energy transfer and has sufficient physical strength to withstand the high centrifugal forces associated with shaft rotation.

In the final steps of the process after the final layer of wrapped material is placed, it is cured under heat and pressure. If necessary, machining of the collar can be done to provide rotational balance.

The E type fiberglass actually used in the preferred embodiment when cured has the following properties:

| density | .070 lbs/cu in. |
|---|---|
| thickness per ply | .009–.100 in. |
| fiber volume | 56% by volume |
| void content | less than 2% |
| resin content | 27% by weight |

The rotating measuring circuit 14 is, of course, powered by the use of photovoltaic cells 23. Silicon photocells are capable of producing power from electromagnetic wavelengths that range from approximately 450 to 1000 nanometers. Peak output occurs at approximately 800 nanometers. Typical current and voltage characteristics of photovoltaic cells are widely published but generally the maximum open circuit voltage is obtained with low light intensity while the short circuit current is proportional to the light intensity and surface area of illumination. When used to power infrared telemetry systems typically the minimum current demand can range from 25 to 100 milliamps. The minimum current draw of the rotating measuring circuit and infrared emitters defines both the minimum photovoltaic surface area and light intensity to power the system.

Since the photovoltaic cells are capable of producing power from the infrared spectrum to 1000 nanometers, the supporting structure is not required to transmit visible light to power the system. System power can be obtained from the infrared spectrum exclusively. Total power output is proportional to the photovoltaic surface area of illumination and infrared intensity after attenuation by the supporting structure. Suitable sources of infrared power include incandescent lamps, halogen lamps, infrared emitters and sunlight.

As an example of the foregoing, a current and voltage attenuation of a typical silicon photovoltaic cell measuring $1.5 \times 0.5$ in. was measured. This cell was illuminated by a 150W halogen lamp powered at 100W. The air gap from the lamp cell was 0.50 in. With merely air in front of the cell and an additional distance of 0.055 in., the output of the cell was approximately 125 milliamps. With E fiberglass at 0.010 in. the output was 92 milliamperes. And increasing the thickness to 0.040 in. the current output was 73 milliamperes. The foregoing illustrates the wide tolerance in thickness available to the designer which will provide sufficient transparency so that the telemetry apparatus is effectively powered.

In a similar manner, infrared emitter and transistor signals can be telemetered through the composite structure. Data transfer is accomplished by maintaining sufficient infrared intensity to transmit a data bit from the emitter to the transistor after attenuation by the composite and air gap. Telemetry is only limited by the radiant intensity of the emitter, sensitivity of the transistor or detector, and the infrared attenuation of the composite layers and air gap.

Infrared signal attenuation was measured through various layers of E-type fiberglass with an infrared emitter of the Siemens-type OP224 and infrared transistor type TRW OP500SRA and an air gap of 0.100 in. Relative attenuation with no composite material thickness was of course 0%. With a composite thickness of 0.020 in., relative attenuation was 36%; then at 0.050 in. the attenuation was 60%. Thus, the range of thickness which will effectively transmit infrared data is quite broad. In addition, the foregoing indicates that many different types of composite materials, such as outlined above, may be used with proper adjustment and thickness, etc.

In the actual preferred embodiment a workable model was made, as illustrated in FIG. 4, with a composite layer 60 overlaying the emitters and transistors 28 and 29 of 0.005 in.

Thus, the present invention has provided an improved method of telemetry for a rotating shaft. It is ideally applicable to optical transfer of data such as by infrared pulses but is also useful for any electromagnetic technique where no mechanical interface can be tolerated.

What is claimed:

1. Telemetry apparatus for transmitting data from a high speed rotating machine shaft to a stationary receiver without a mechanical interface comprising:
a collar of lightweight composite material wrapped around and fixed to said shaft which resist centrifugal forces due to said high speed shaft rotation, said collar having embedded in it a first portion of said telemetry apparatus for transmitting data by light or electromagnetic means to said stationary receiver through a portion of said composite material which is substantially transparent to said transmission, said collar having embedded in it a second portion of said telemetry apparatus for receiving energy from said stationary receiver for powering said first portion of said telemetry in the form of light or electromagnetic energy through a portion of said composite material substantially transparent to said 2. Apparatus as in claim 1 where said collar may be fixed to machine shafts having a plurality of shaft diameters without modification of said shafts.

3. Apparatus as in claim 1 where said collar is formed of wrapped layers of said composite material to effectively resist said centrifugal forces.

4. Apparatus as in claim 1 where said second portion of said telemetry apparatus includes photovoltaic cells responsive to incident light form said stationary receiver.

5. Apparatus as in claim 1 where said first portion of said telemetry apparatus includes infrared emitters and transistors for data interchange.

* * * * *